United States Patent
Rehnberg et al.

(10) Patent No.: US 9,807,560 B2
(45) Date of Patent: Oct. 31, 2017

(54) METHOD AND NETWORK NODE FOR ENABLING POSITION DETERMINATION OF A USER EQUIPMENT MEASUREMENT

(75) Inventors: Peter Rehnberg, Linköping (SE); Fredrik Gunnarsson, Linköping (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 73 days.

(21) Appl. No.: 14/409,562

(22) PCT Filed: Jun. 20, 2012

(86) PCT No.: PCT/SE2012/050684
§ 371 (c)(1),
(2), (4) Date: Dec. 19, 2014

(87) PCT Pub. No.: WO2013/191602
PCT Pub. Date: Dec. 27, 2013

(65) Prior Publication Data
US 2015/0327018 A1    Nov. 12, 2015

(51) Int. Cl.
*H04L 1/00* (2006.01)
*H04W 4/02* (2009.01)
(Continued)

(52) U.S. Cl.
CPC ........... *H04W 4/025* (2013.01); *G01S 5/0036* (2013.01); *G01S 5/02* (2013.01); *G01S 5/0205* (2013.01);
(Continued)

(58) Field of Classification Search
CPC ..... H04W 24/02; H04W 24/04; H04W 24/08; H04W 24/10
(Continued)

(56) References Cited

U.S. PATENT DOCUMENTS 5,293,645 A * 3/1994 Sood ................. G01S 5/021
455/456.2
5,960,355 A * 9/1999 Ekman .............. G01S 5/0009
455/456.1
(Continued)

FOREIGN PATENT DOCUMENTS

EP      2288200 A1    2/2011
WO   2011082831 A1    7/2011

OTHER PUBLICATIONS

3GPP, "3rd Generation Partnership Project; Technical Specification Group Radio Access Network; Evolved Universal Terrestrial Radio Access (E-UTRA); Physical layer; Measurements (Release 10)", 3GPP TS 36.214 V10.1.0, Mar. 2011, 1-13.
(Continued)

*Primary Examiner* — Dmitry H Levitan
(74) *Attorney, Agent, or Firm* — Patents on Demand P.A.; Brian K. Buchheit

(57) ABSTRACT

Method and a network node (110, 910) for enabling position determination of a measurement performed by a user equipment (120) served by a base station (110). The user equipment (120) and the base station (110) are comprised in a cellular communications network (100). A measurement report comprising measurement data associated with the measurement and a time of measurement thereof is received (301, 801) from the user equipment (120). One or more first type of data associated with the user equipment (120) at a respective point in time are retrieved (302, 802), which first type of data is localization corresponding data. Based on the time of measurement, first type of data that corresponds to the time of measurement is determined (303, 803) from the retrieved one or more first type of data. The determined first type of data is associated (304, 804) with the measurement data. The position of the measurement may then be deter-
(Continued)

mined based on the first localization corresponding data associated with the measurement data.

20 Claims, 9 Drawing Sheets

(51) Int. Cl.
*H04W 24/08* (2009.01)
*G01S 5/00* (2006.01)
*G01S 5/02* (2010.01)
*H04W 64/00* (2009.01)
*H04W 16/18* (2009.01)

(52) U.S. Cl.
CPC ........... *H04W 24/08* (2013.01); *H04W 64/00* (2013.01); *H04W 16/18* (2013.01)

(58) Field of Classification Search
USPC .......................... 370/241, 242, 310, 328, 338
See application file for complete search history.

(56) References Cited

U.S. PATENT DOCUMENTS

| | | | | |
|---|---|---|---|---|
| 5,987,329 | A * | 11/1999 | Yost | H04W 64/00 342/357.31 |
| 7,127,257 | B2 * | 10/2006 | Riley | G01S 5/0205 455/414.1 |
| 7,826,837 | B1 * | 11/2010 | Sylvester | H04W 24/06 455/423 |
| 8,213,955 | B2 * | 7/2012 | Carlson | G01S 5/0036 342/357.2 |
| 8,331,956 | B2 * | 12/2012 | Islam | G01S 5/0215 455/423 |
| 8,447,319 | B2 * | 5/2013 | Carlson | G01S 5/0205 455/404.2 |
| 8,509,810 | B2 * | 8/2013 | Sanders | G01S 3/30 342/450 |
| 8,526,968 | B2 * | 9/2013 | Alles | G01S 5/021 370/328 |
| 9,241,241 | B2 * | 1/2016 | Amirijoo | H04W 64/00 |
| 2003/0125046 | A1 | 7/2003 | Riley et al. | |
| 2009/0131073 | A1 | 5/2009 | Carlson et al. | |
| 2012/0087258 | A1 * | 4/2012 | Lee | H04W 24/10 370/252 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V9.2.0, Mar. 2010, 1-248.

3GPP, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9)", 3GPP TS 36.305 V9.2.0, Mar. 2010, 1-52.

3GPP, "3rd Generation Partnership Project; Technical Specification Group Radio Access Network; Study on Minimization of drive-tests in Next Generation Networks; (Release 9)", 3GPP TR 36.805 V9.0.0, Dec. 2009, 1-24.

Tomala, Malgorzata et al., "Supporting Function: Minimisation of Drive Tests (MDT)", In: LTE Self-Organising Networks (SON), Chapter 7, John Wiley & Sons, Ltd, Chichester, UK, Dec. 9, 2011, 267-310.

Medbo, J. et al., "Propagation Channel Impact on LTE Positioning Accuracy", 2009 IEEE 20th International Symposium on Personal, Indoor and Mobile Radio Communications, Tokyo, JP, Sep. 13-16, 2009, pp. 2113-2217.

Yost, G. P. et al., "Automatic Location Identification Using a Hybrid Technique", 48th IEEE Vehicular Technology Conference, vol. 1, Ottawa, Ontario, CA, May 18-21, 1998, pp. 264-267.

* cited by examiner

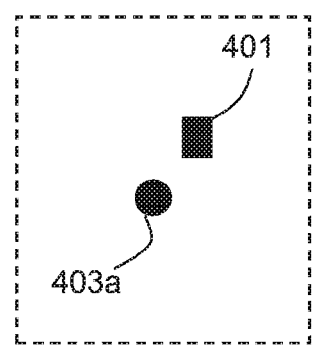
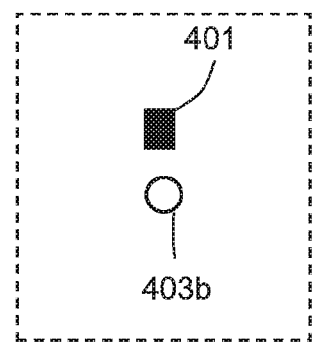
Fig. 4a
Fig. 4b   Fig. 4c

METHOD AND NETWORK NODE FOR ENABLING POSITION DETERMINATION OF A USER EQUIPMENT MEASUREMENT

TECHNICAL FIELD

Embodiments herein relate to a method and a network node, such as a base station. In particular embodiments herein relate to position determination of a user equipment measurement.

BACKGROUND

Communication devices such as User Equipments (UE) are also known as e.g. mobile terminals, wireless terminals and/or mobile stations. A user equipment is enabled to communicate wirelessly in a cellular communications network, wireless communications system, or radio communications system, sometimes also referred to as a cellular radio system or cellular networks. The communication may be performed e.g. between two user equipments, between a user equipment and a regular telephone and/or between a user equipment and a server via a Radio Access Network (RAN) and possibly one or more core networks, comprised within the cellular communications network.

The user equipment may further be referred to as a mobile telephone, cellular telephone, laptop, Personal Digital Assistant (PDA), tablet computer, surf plate, just to mention some further examples. The user equipment in the present context may be, for example, portable, pocket-storable, hand-held, computer-comprised, or vehicle-mounted mobile devices, enabled to communicate voice and/or data, via the RAN, with another entity, such as another user equipment or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells.

Further, each base station may support one or several communication technologies. The base stations communicate over the air interface operating on radio frequencies with the user equipment within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies, for example into evolved UTRAN (E-UTRAN) used in LTE.

In the context of this disclosure, the expression downlink (DL) is used for the transmission path from the base station to the user equipment. The expression uplink (UL) is used for the transmission path in the opposite direction i.e. from the user equipment to the base station.

Operators of cellular communications networks today have considerable manual effort in planning, configuring, optimizing, and maintaining their networks. These efforts can consume a great part of their operational expenditures (OPEX). One important E-UTRAN requirement from the operators' side is a significant reduction of the manual effort in the deployment, configuration, and optimization phases for this in future wireless access system. This involves automation of the tasks typically involved in operating a network, e.g., planning, verification through, e.g., drive and/or walk testing, and optimization.

Today, operators resort to planning tools to dimension and plan their networks according to a specific business strategy. The approach based on planning tools and prediction is, however, not fully accurate. Reasons for the inaccuracies include imperfections in the used geographic data, simplifications and approximations in the applied propagation models, and changes in the environment, e.g., construction/demolition or seasonal effects (foliage changes). Furthermore, changes in the traffic distribution and user profiles can lead to inaccurate prediction results. The above mentioned shortcomings force operators to continuously optimize their networks using measurements and statistics, and to perform drive and/or walk tests. Drive and/or walk testing provides a picture of the end user perception in the field at certain positions and enables the operator to identify locations with poor performance and their corresponding cause (e.g handover settings). The drive and/or walk tests involve registering the position and connecting it to the test results. Drive and/or walk tests are, however, not ideal since only a limited part of the network can be analyzed due to access restrictions and the cost and time involved. Further, only a snapshot in time of the conditions in the field is captured.

SUMMARY

Hence, in view of the above, an object of embodiments herein is to overcome, or at least alleviate, problems in the prior art. More specifically the object is to reduce the need of the prior art drive and/or walk testing.

According to a first aspect of embodiments herein, the object is achieved by a method in a network node for enabling position determination of a measurement performed by a user equipment served by a base station. The user equipment and the base station being comprised in a cellular communications network. A measurement report comprising measurement data associated with the measurement and a time of measurement thereof is received from the user equipment. One or more first type of data associated with the user equipment at a respective point in time is retrieved, which first type of data is localization corresponding data. Based on the time of measurement, first type of data that corresponds to the time of measurement is determined from the retrieved first type of data. The determined first type of data is then associated with the measurement data, thereby enabling the position determination.

According to a second aspect of embodiments herein, the object is achieved by a network node for enabling position determination of a measurement performed by a user equipment served by a base station. The network node, the base station and the user equipment being comprised in a cellular communications network. The network node comprises a receiving port configured to receive, from the user equipment, a measurement report comprising measurement data associated with the measurement and a time of measurement thereof. The network node further comprises a retrieving circuitry, configured to retrieve one or more first type of data associated with the user equipment at a respective point in time, which first type of data is localization corresponding data. Moreover, the network node comprises a determining circuitry, configured to, based on the time of measurement, determine a first type of data from the retrieved one or more first type of data, which determined first type of data corresponds to the time of measurement. Additionally, the network node comprises an associating circuitry, configured to associate the determined first type of data with the measurement data, thereby enabling the position determination.

By localization corresponding data is here meant any data that has direct or indirect correspondence to an absolute or relative localization. It should be noted that localization corresponding data may have another purpose and be available for other reasons than position determination. A relative localization of the user equipment is for example an area defined in relation to a base station serving the user equipment. Since the base station has an absolute geo-position, the area is transformable to and corresponds to an absolute localization area, or position, which thus may be determined based on the localization corresponding data. What constitutes localization corresponding data in a particular cellular communications network is realized by the skilled person and will be even better understood from embodiments and examples given herein.

Hence, the determining of first type of data that corresponds to the time of the measurement, followed by the association with the measurement data, results in first type of data relevant for the measurement data. Since the first type of data is localization corresponding, a localization has thus been associated with the measurement. The position of the measurement may be determined based on the first type of data associated with the measurement report. Note that the measurement data and the first type of data may be unrelated to begin with, may have different origin and even purpose and may be provided independently from each other.

When the user equipment experiences reduced quality of the received signal from the serving base station, or when the serving base station experiences reduced quality of the signal from the user equipment, most, if not all cellular communications systems, comprise some mechanism that makes the user equipment provide the serving base station, and/or neighbouring base station or stations, with one or many measurement reports for enabling, or at least supporting, further handling of the situation, such as performing handover to an neighbouring base station. Such reports comprise e.g. signal strength measurement reports. Hence, embodiments herein are particularly well adapted to be used to enable position determination of user equipment measurements relating to cell border regions or in general user equipment measurements relating to reduced signal quality experienced by user equipment. Or in other words, embodiments herein enable position determination of measurements that identify locations with poor performance, which also is achieved by and often the aim of the drive and/or walk tests mentioned in the background. Hence, the embodiments herein reduce the need of such drive and/or walk testing.

Further, embodiments herein may utilize measurement reports and localization corresponding data that is already supported or even already being performed in existing cellular communications networks, such as existing LTE networks. This means that embodiments herein may be implemented using no, or at least with very limited, additional signaling in the cellular communications network.

Moreover, as understood by the skilled person, embodiments herein may be automated to a greater extent than the drive and/or walk tests and may require only implementation of new functionality in already existing hardware resources, not that additional hardware related resources outside the cellular communications network need to be utilized as e.g. is the case for the drive and/or walk tests.

BRIEF DESCRIPTION OF THE DRAWINGS

Examples of embodiments herein are described in more detail with reference to the appended schematic drawings, in which:

FIGS. 4a-c are schematic diagrams for illustrating and exemplifying relations between measurement data and first type of data that is localization corresponding.

DESCRIPTION

Figure 1:
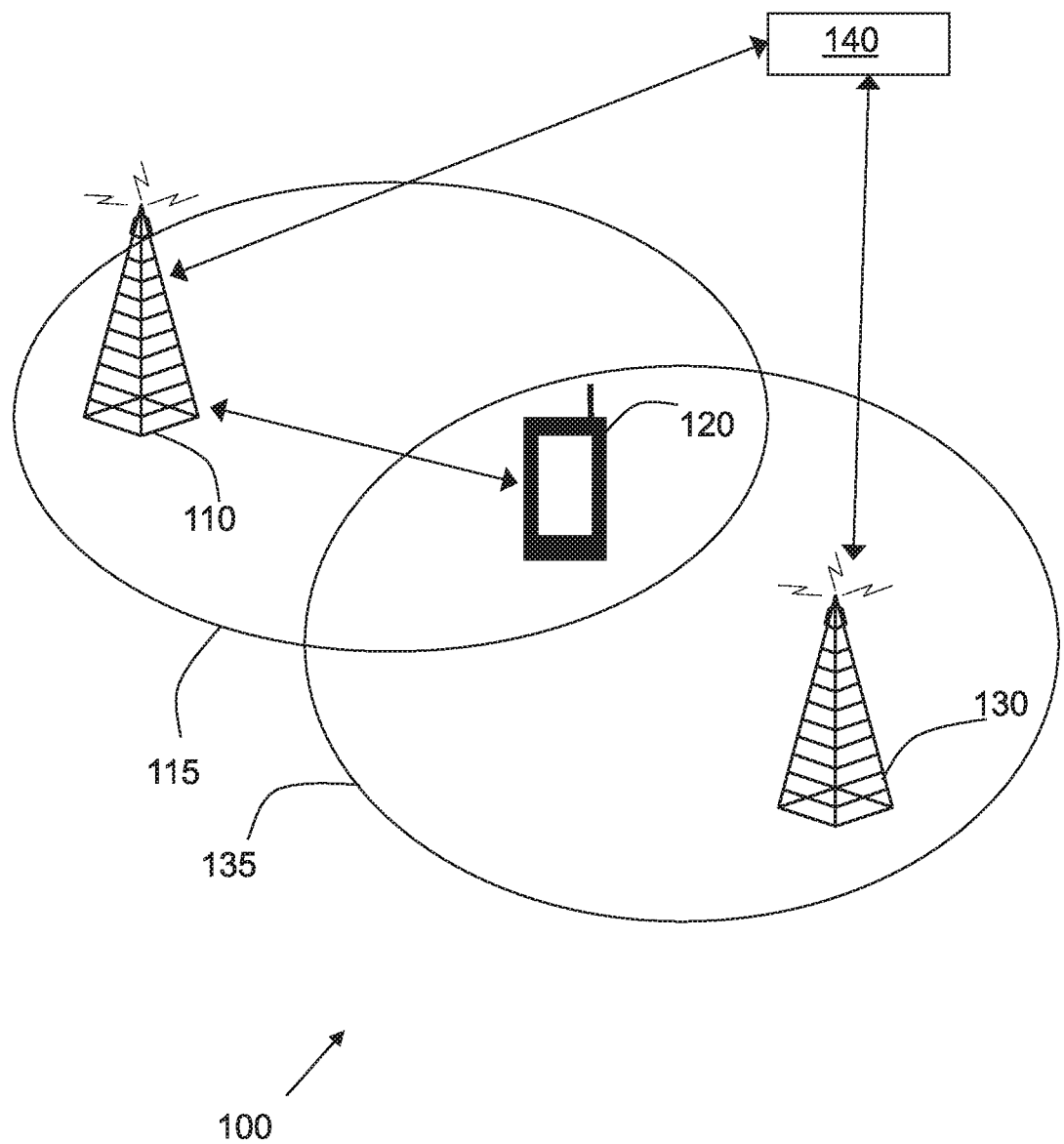
FIG. 1 is a schematic block diagram depicting an example of a cellular communications network.

As part of the development towards embodiments herein, the problem indicated in the background and position determining will first be further discussed, with particular reference to LTE.

One method for overcoming difficulties associated with drive and/or walk tests is to use the user equipments (UEs) to report observed service quality along with the locations where measurements are taken. Standardization of such UE reports is being carried out in 3GPP, see for example 3GPP TR 36.805, "Study on Minimization of drive-tests in Next Generation Networks", Version 9.0.0. In LTE, the UE basically may report anything that can be configured via the Radio Resource control (RRC), see for example 3GPP TS 36.331, "Radio Resource Control", Version 9.2.0. Such reports are typically referred to as "UE measurement reports" in LTE. The measurements may further be tagged with position estimates, see for example 3GPP TS36.305, "Universal Terrestrial Radio Access (E-UTRA); Stage 2 functional specification of User Equipment (UE) positioning in E-UTRAN (Release 9)", Version 9.2.0. The UE measurement reports or similar may be used by a function which continuously monitors the network and estimates the spatial network performance, e.g., coverage and throughput. However, this may require dedicated functionality to be implemented and executed in the UE and also that the measurements are carried out in a synchronized manner with provision of the position estimates.

In LTE there are mainly three different localization methods that may be used for position determination.

A first localization method is a network-assisted version of Global Navigation Satellite Systems (GNSSs), such as Global Positioning System (GPS) or Galileo. Different GNSSs can be used individually or in combination with other GNSSs. The network assists a user equipment GNSS receiver by providing assistance data (e.g., visible satellite list, clock corrections, reference positions) to reduce the user equipment start-up and acquisition times, to increase the user equipment GNSS sensitivity, and to allow the UE to consume less handset power than with stand-alone GNSS. The network-assisted GNSS methods rely on signalling between user equipment GNSS receivers and a continuously operating GNSS reference receiver network which has clear sky visibility of the same GNSS constellation as the assisted UE. This is not the case in all situations and not all user equipment support GNSS. With GNSS a very high accuracy can be achieved.

The second localization method is a Time Difference Of Arrival (TDOA) method named Observed Time Difference Of Arrival (OTDOA). This method utilizes the differences of time measurements of downlink radio signals from at least three eNodeBs along with the knowledge of the geographical coordinates of the measured eNodeBs and their relative downlink timing for calculating the UE position. In order to increase the hearability of the eNodeBs a Positioning Reference Signal (PRS) with a frequency reuse of six in combination with low-interference subframes (LIS) may be used. However, since the method, for sufficient accuracy, typically requires signals from three eNodeBs, it is not always suitable or possible to use.

A third localization method is an enhanced cell ID positioning (E-CID) method, which uses information about the serving cell and the knowledge of the geographical coordinates of the serving eNodeB for estimating the UE position. Additional radio resource measurements like the Reference Signal Received Power (RSRP) or the Reference Signal Received Quality (RSRQ) can be used to improve the UE location estimate. Also Timing Advance (TA) and Angle of Arrival (AoA) estimated in the base station may be considered for E-CID. Although this kind of method may not provide as good accuracy as the other two methods, it has the advantage that is imposes less strict requirements on the user equipment and on situations and locations where the method is applicable and may be carried out.

Hybrid positioning using multiple methods from the above mentioned positioning methods is also possible.

Position information may be reported together with the estimated errors (uncertainty) of the position and the velocity of the UE. The uncertainty of the position information e.g. depends on the used method, the position of the UE, and the activity of the UE.

FIG. 1 is a schematic block diagram depicting an example of a cellular communications network 100, which may be an LTE cellular network. The cellular communications network 100 may comprise a radio access network and a core network (not explicitly indicated in FIG. 1). In an LTE-based or related system, the radio access network may correspond to what commonly is referred to as the Evolved UMTS Terrestrial Radio Access Network (E-UTRAN) and the core network may correspond to what commonly is referred to as the Evolved Packet Core (EPC). The shown radio communications system 100 comprises a base station 110 serving a first cell 115 and a neighbouring base station 130 serving a second cell 135. By a base station serving a cell is here meant the ability to wirelessly send downlink data and/or receiving uplink data via radio communication in the cell to a user equipment comprised therein. By neighbouring base station 130 is meant that it is neighbouring in relation to the base station 110, and more specifically that the neighbouring base station 130 is located so that it has overlapping radio coverage with the base station 110, illustrated in FIG. 1 by the shown overlap between the first cell 115 and the second cell 135. As understood, radio coverage and cells overlap at least in cell border regions. The base station 110 and the neighbouring base station 130 may be a respective eNodeB, but may in other embodiments be of another type and/or be referred to by different names, such as RBS, NodeB, eNB, BTS, depending on technology and terminology used.

The cellular communications network 100 shown in FIG. 1 further comprises a user equipment 120. The user equipment 120 is shown located within both cells 115, 135, and may thus be served by either one of the base station 110 and the neighbouring base station 130. However, here and in examples to follow it will be assumed that the user equipment 120 is being served by the base station 110. In the shown example the user equipment 120 is located in both cells 115, 135. The neighbouring base station 130 thereby may be a handover candidate for the user equipment 120, or another user equipment, being served by the base station 110 and located within the overlap. However, it should be noted that the situation schematically shown in FIG. 1 is merely an example and not a situation that is a prerequisite for embodiments herein, as will be understood from the below. For example, although embodiments here may be of most interest and may be most beneficial for user equipment measurements carried out when the user equipment 120 is in a cell border region, as typically is the case when the user equipment 120 is located within coverage of more than one cell, such as in said overlap shown in FIG. 1, embodiments herein may be applicable also to a situation when the user equipment 110 is located only within coverage of a single cell. When the radio communications system 100 comprises a radio access network and a core network, the user equipment 120 is typically comprised in and can receive and send information over the radio access network.

The cellular communications network 100 may further comprise a management entity 140, as shown in FIG. 1. The management entity 140 is associated with the radio communications system 100 and has knowledge of and is able to contact base stations comprised therein, including the base station 110 and the neighbouring base station 120. In some embodiments the management entity 140 may be integrated or located with a base station. In case of an LTE-based or related system, the management entity may be a device, for example a server, that implements functionality pertaining to what is commonly referred to as Domain Management (DM) and/or Network Management System (NMS). When the radio communications system 100 comprises a radio access network and a core network, as mentioned above and is the case for LTE, the management entity 140 is typically comprised in and arranged to receive and send information over the core network.

It is reminded that FIG. 1 is merely schematic and that the cellular communications network 100 in reality may comprise several further base stations, user equipment, and other network nodes, including management entities, which are not shown in the figure.

Figure 2:
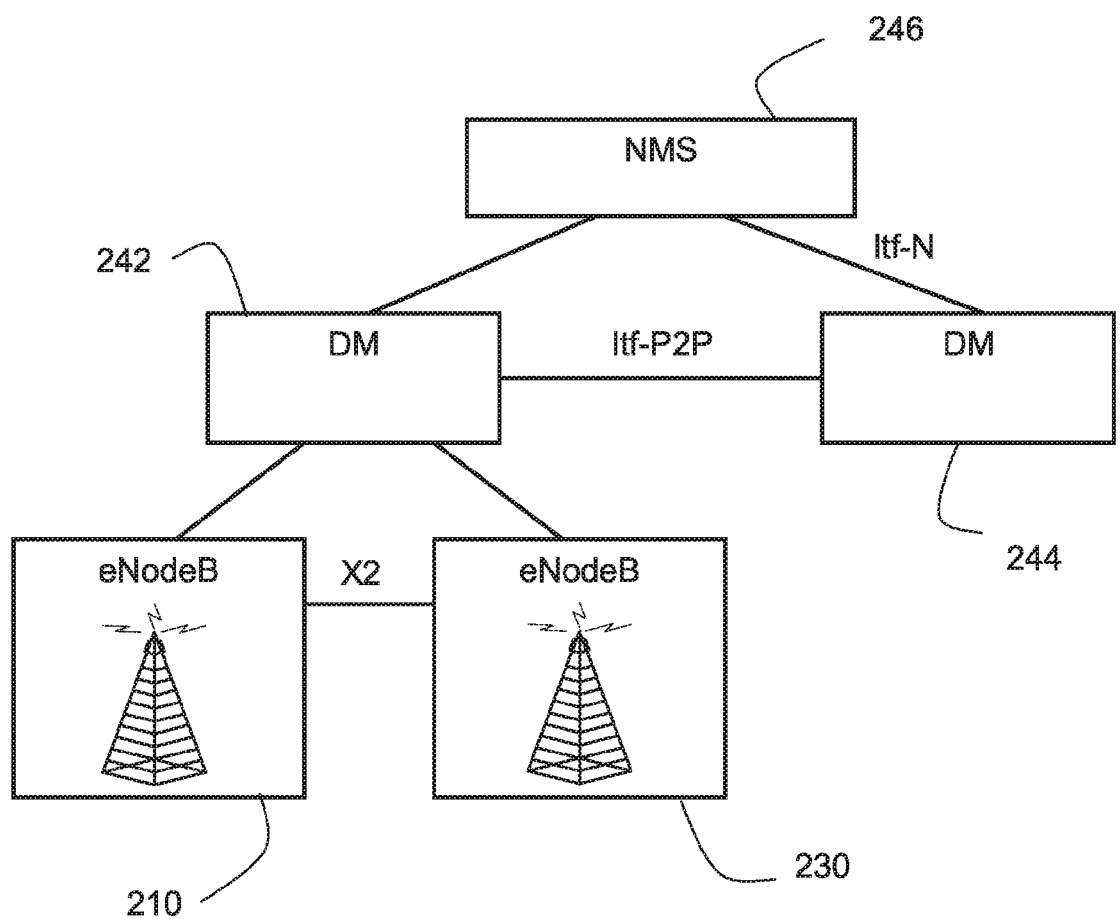
FIG. 2 is a schematic block diagram showing an LTE based example of a management system that may be used with embodiments herein.

FIG. 2 is a schematic block diagram showing an LTE based example of a management system that may be used with embodiments herein and may be part of the cellular communications network 100 discussed in the foregoing. Two base stations 210, 230, are shown with a logical interface X2, used in LTE, for communication between the base stations 210, 230. The base stations may e.g. correspond to the base stations 110, 130 shown in FIG. 2. The base stations 210, 230 are managed by a Domain Manager (DM) 242, which may also be referred to and/or be part of an Operation and Support System (OSS). Also a second Domain Manager 244 is shown. The two DMs 242, 244 are in turn managed by a Network Management System (NMS) 246. An interface peer-to-peer (Itf-P2P) for communication between the DMs 242, 244 is also shown in the figure, as well as an interface North (Itf-N) for communication between the NMS 246 and respective DM 242, 244. One or more of the DMs and the NMS may correspond to the management entity 140 shown in FIG. 1.

Network node is a common denomination that may be used for any one of the base stations 110, 130, the management entity 140, the NMS 246, the DMs 242, 246 and any corresponding entity in the cellular communications network 100. When network node is referred to herein, e.g. for carrying out an action and/or method, it is an indication that the action and/or method may be carried out by in principle any network node of the cellular communications system 100, which network node may directly, or indirectly via a base station, receive information from the user equipment 120.

Embodiments herein for enabling position determination of a measurement performed by the user equipment 120 will now be described with reference to the combined signaling diagram and flowchart depicted in FIG. 3. The actions numbered in the figure and referred to below may e.g. be carried out in the network node 910 referred to below, the base station 110, the management entity 140, or a combination thereof. Where the respective action may be carried out is also discussed below in connection with respective action.

Action 301

A measurement report comprising measurement data associated with a time of measurement is received from the user equipment 120.

Measurement data is typically a measurement value or values resulting from the measurement. The unit or units of the measurement values may be explicitly comprised in the measurement data as such and/or in the measurement report, or may follow implicitly by being predetermined. Specific examples of different measurement data in the case of LTE are Reference Symbol Received Power (RSRP), Reference Symbol Received Quality (RSRQ) and Observed Time Difference of Arrival (OTDOA). These and additional kind of measurement data are further described and exemplified below. In the case of LTE, the measurement data may in general relate to measurements that can be reported via the Radio Resource Control (RRC) protocol layer.

The measurement report provides a structured arrangement of the measurement data. The purpose of the report may e.g. be one or many of the following: to group measurement data that belong together, to group the measurement data with additional information, to facilitate and/or enable interpretation of the measurement data, to facilitate and/or enable transfer of the measurement data.

The measurement data may be associated with the time of measurement explicitly, for example through a time stamp in the measurement report or time information incorporated in the measurement data as such. In some embodiments the association may be implicit, for example when the time of measurement is predetermined.

The time of measurement is further discussed and explained below in connection with FIG. 4.

The measurement report may comprise second type of data associated with the user equipment 120 at the time of measurement, which second type of data is localization corresponding data. First type of data that is localization corresponding is discussed below under action 302. By localization corresponding data is referred to any data that has direct or indirect correspondence to an absolute or relative localization. Localization corresponding data may have another purpose and be available for other reasons than position determination. A relative localization of the user equipment 120 is for example an area defined in relation to a base station 110 serving the user equipment 120. Since the base station 110 has an absolute geo-position, the area is transformable to and corresponds to an absolute localization area, or position, which thus may be determined based on the localization corresponding data. What constitutes localization corresponding data in a particular cellular communications network is realized by the skilled person and from embodiments and examples given herein.

The second type of data may comprise direction of departure related measurement data and/or time difference of arrival measurement data. Such kind of measurement data and how it constitute localization corresponding data will be explained separately below. The measurement data may as such be second type of data that is localization corresponding, e.g. may be direction of departure related measurement data and/or time difference of arrival measurement data. The direction of departure related measurement data may comprise received signal strength measurement data.

Since the second type of data is comprised in the measurement report and thus associated with the user equipment 120 at the time of measurement. This in combination with determined first type of data, also localization corresponding, and that corresponds to the time of measurement, as discussed below, enables determining the position of the measurement using both the first and the second type of data. This enables more accurate position determination than from only the determined first type of data. For example, the determined first type of data may correspond to a first localization area of the user equipment at the time of measurement and the second type of data may correspond to a second localization area of the user equipment at the time of measurement. The overlap of said areas may then correspond to a localization area for more accurate position determination of the measurement.

The measurement report may be received by the base station 110 in response to an event triggered by the user equipment 120 when receiving a weak and/or low quality signal from the base station 110. An example of such event triggered measurement report is an event used for handover triggering, i.e. such sent in situations when the user equipment is in or is entering a cell border region of the cell 115 with bad radio coverage by the base station 110. An advantage from using embodiments herein with this kind of event triggering, as will be understood by the skilled person and with support from the actions described below, is that it thereby is enabled position determination of cell border regions and more general of locations with bad radio coverage and that this may be carried out in an automated manner. Another advantage is that embodiments herein may be triggered by and utilize measurement reporting already supported in the cellular communications network 100.

Note that the measurement report may be sent by the user equipment 120 directly following a completed measurement, but may also be delayed and sent at a later point in time. For example, a measurement may be carried out when the user equipment 120 is not able to contact the base station 110 for some reason and the user equipment 120 stores the measurement data for sending it to the base station 110 at a later point in time when this is possible. And/or that the user equipment 120 sends the measurement report at a later point in time when it has been explicitly requested to do so by or via the base station 110. In the latter case the request may e.g. be sent from the management entity 140 via the base station 110.

Figure 3:
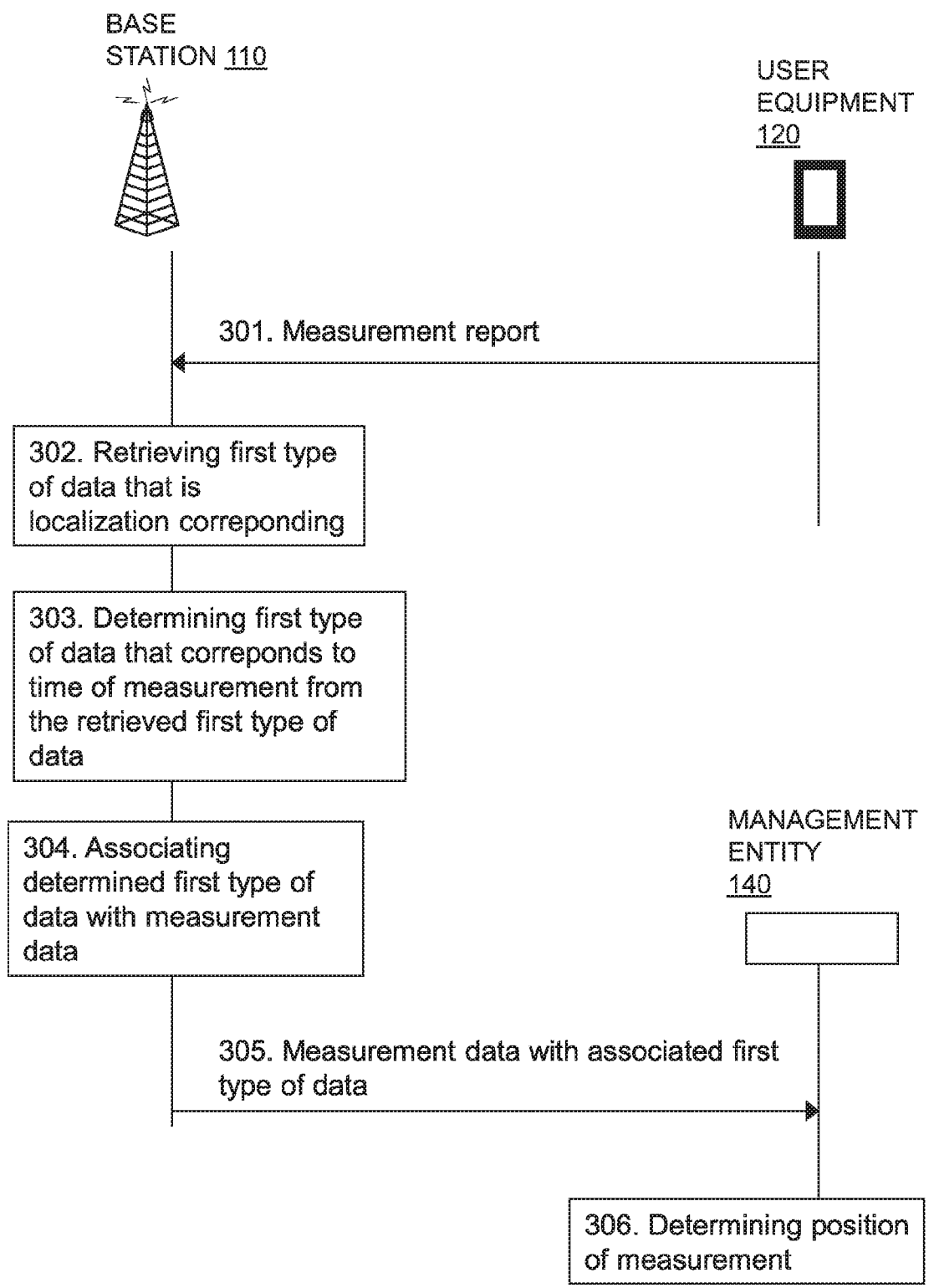
FIG. 3 is a combined signalling diagram and flowchart illustrating embodiments herein.

In FIG. 3 it is the base station 110 that is shown to receive the measurement report in action 301. In some other embodiments the measurement report may be forwarded to another network node, for example one where action 302, 303 and/or 304 discussed below are carried out. See above for further examples of what may constitute a network node.

Action 302

One or more first type of data associated with the user equipment 120 at a respective point in time is retrieved, which first type of data is localization corresponding data. The first type of data may be provided, typically by the base station 110, independent on the measurement performed by the user equipment 120.

The first type of data may comprises time measurement data corresponding to a distance to the user equipment 120. Such time measurement data may comprise round trip time measurement data. Round trip time measurements or similar are typically performed and provided regularly by and in base stations for timing purposes and will be further discussed below.

It is of particular interest, at least in case of LTE, to use first type of data comprising round trip time measurement data together with second type of data, as discussed above under action 301, comprising direction of departure related data and/or time difference of arrival measurement data. Detailed examples of how such localization corresponding type of data may be used together will be presented below.

In FIG. 3 the base station 110 is shown to retrieve the first type of data for action 302. In some embodiments the first type of data may instead be retrieved by another network node than the base station 110 and the retrieval may then involve receiving the first type of data from the base station 110. For example, when the received measurement report has been forwarded by the base station 120 to another network node, as discussed above under action 301, that network node may retrieve the first type of data. Retrieving the first type of data may in general comprise receiving it wholly or partly within or from the base station 120 and/or user equipment 110.

The first type of data may further wholly or partly origin from the user equipment 110. When the first type of data comprises round trip time measurement data as mentioned above, this is an example of when the first type of data partly origins from the user equipment 120, as recognized by the skilled person. In some embodiments the first type of data may wholly or partly be received from another network node or nodes that provide information about previous, present or future localization of the user equipment, for example from another base station or stations (not shown), from the user equipment 120 or from the management entity 140.

Action 303

Based on the time of measurement, first type of data that corresponds to the time of measurement is determined from the retrieved one or more first type of data.

By this it is thus provided first type of data that is localization corresponding and associated with the time of measurement and thereby also to the measurement and the measurement data thereof. Note that the first type of data as such may be unrelated with the measurement and e.g. provided independently from the measurement.

Hence, the determining of first type of data that corresponds to the time of the measurement, followed by the association with the measurement data, results in first type of data relevant for the measurement data. Since the first type of data is localization corresponding, as stated above, a localization has thus been associated with the measurement. The position of the measurement maybe determined based on the first type of data associated with the measurement report.

In some embodiments the determining comprises selecting retrieved first type of data that is associated with the user equipment 120 at a point in time that is adjacent the time of measurement. For example, selecting data available closest to the time of measurement or sufficiently close for enabling sufficiently accurate position determination of the measurement. What is sufficiently accurate position determination in a given situation is realized by the skilled person.

In some embodiments the determining may comprise interpolating retrieved first type of data that are associated with the user equipment 120 at points in time that are before and after the time of measurement. The points in time before and after may be a respective adjacent point in time selected according to the preceding paragraph. The interpolating enables provision of first type of data that is localization corresponding and better corresponds to the time of measurement, as recognized by the skilled person.

The determining in this action is explained and exemplified in some further detail below in connection with FIG. 4.

In FIG. 3 action 303 is indicated to be carried out in the base station 110. In some embodiments action 303 may instead be carried out in another network node, e.g. the management entity 140. See above for further examples of what can constitute a network node. In such embodiments, there is an action, not shown in FIG. 3, where the measurement report or relevant information originating therefrom is sent from the base station 110 to said another network node. Depending on where the retrieval of the first type of data is taken place in such embodiments, there may additionally be involved, as realized by the skilled person, sending of retrieved first type of data from the base station or other network node.

Action 304

The determined first type of data is being associated with the measurement data, thereby enabling the position determination.

The associating may be performed and be realized in many different ways as should be appreciated by the skilled person. Some examples: The determined first type of data may be added to the measurement report in connection with the measurement data and/or any time stamp therein indicating the time of measurement. Relevant data from the measurement report may also be extracted from the measurement report and directly or indirectly be connected to the determined first type of data, for example by a common reference number. The association may be performed by forwarding the measurement report and/or the measurement data together, e.g. in a common signal or message, such as for the sending to the management entity 140 as discussed below for action 305.

In FIG. 3 action 304 is indicated to be carried out in the base station 110. In some embodiments action 303 may instead be carried out in another network node, e.g. the management entity 140. See above for further examples of what can constitute a network node. This other network node may be the same another network node as any such discussed for action 302-303 above, or yet another network node. Hence, similarly as discussed above, and as realized by the skilled person, for embodiments where action 304 is carried out in another node than action 303, there may be an action (not shown) for sending information from the network node of action 303 to the network node of action 304.

Action 305

This is an optional action where the determined first type of data associated with the measurement data is sent to the management entity 140. This in order for the management entity to carry out optional action 306 discussed below.

In some embodiments when the action 306 is carried out in a network node where the measurement report and its associated first localization corresponding data is already present, there may be no action 304 since it is then superfluous. This may for example be the case if action 306 is carried out in the base station 110 instead of in the management entity 140, or if action 304 is being carried out in the management entity 140.

Action 306

This is an optional action for embodiments herein, where the position of the measurement is determined based on the determined first type of data associated with the measurement data.

As mentioned above, localization corresponding data may have another purpose and primarily be available for other reasons than position determination and therefor typically needs some further processing in order to result in an actual position, such as an absolute geo-position. Such processing may be suitably performed by another network node than previous actions, e.g. by the management entity 140 as shown in FIG. 3 when the previous actions are performed in the base station 110. The management entity 140 typically has coverage and map information with geo-positions of base stations connected thereto and therefore may be more suitable for determining the position than the base station 110. In this sense the management entity 140 may thus be regarded or correspond to a positioning node. However, in some embodiments position determination may be carried out in the same network node as one or many of the previous actions.

Following what has been discussed above with reference to FIG. 3, FIGS. 4a-c will now be discussed to further enhance understanding of embodiments herein.

FIG. 4a is a schematic diagram for illustrating and exemplifying relations between the measurement data and the first type of data. Along the upper time scale of FIG. 4a presence of measurement data from the measurement performed by the user equipment 120 is schematically illustrated, while along the lower time scale presence of first type of data that is localization corresponding is schematically illustrated.

The measurement data is illustrated by a black filled square 401 at the time of measurement. The time of measurement may correspond to a point or interval in time when the user equipment 120 carried out the measurement resulting in the measurement data, which may be when the user equipment 120 received a signal comprising information resulting in the measurement data. In some embodiments the time of transmission or receipt of the measurement report is used as the time of measurement.

The first type of data is illustrated by filled black circles, and shown being regularly provided in time. As already indicated, the localization corresponding first type may correspond to round trip time measurement data provided by the base station 110 and may be provided independent on the measurement.

First type of data that is localization corresponding and has been retrieved are illustrated by the black filled circles 402-1 and 402-2, here data available at points in time adjacent before and after the time of measurement. As mentioned above the retrieving may be carried out internally in a network node, e.g. in the base station 115. In some embodiments all available first type of data is retrieved. In some embodiments all first type of data that is localization corresponding and available within a time window comprising the time of measurement is retrieved.

As mentioned previously, based on the retrieved first type of data and the time of measurement, first type of data that corresponds to the time of measurement is determined.

The black filled circle 403a shown in FIG. 4a illustrates an example of first type of data that is localization corresponding and has been determined by selecting the retrieved first type of data that is associated with the user equipment 120 at a point in time that is most adjacent the time of measurement. The determined first type of data corresponding to the black circle 403a has thus resulted from selecting retrieved first type of data corresponding to the black circle 402-1 from the total of retrieved first type of data. In the shown example the total of retrieved first type of data corresponds to 402-1 and 402-2.

FIG. 4b schematically illustrates the determined first type of data 403a associated with the measurement data 401.

The white circle 403b shown in FIG. 4a illustrates an example of first type of data that is localization corresponding and has been determined by interpolating the retrieved first type of data that are associated with the user equipment 120 at points in time that are before and after the time of measurement. The determined first type of data corresponding to the white circle 403b has thus resulted from interpolating retrieved first type of data corresponding to the black filled circles 402-1 and 402-1.

FIG. 4c schematically illustrates the determined first type of data 403b associated with the measurement data 401.

From the above, and as understood from FIGS. 4b and 4c, the interpolating enables first type of data that has better correspondence, or in other words are better aligned, with the time of measurement.

It should be noted that the retrieving and the determining may, but not necessarily, be carried out in one and the same action, for example, in case only the most adjacent first type of data being retrieved, this may thus also be regarded as determining of the first type of data that corresponds to the time of measurement.

Examples of different kind of measurements that may be subject for embodiments herein and corresponding measurement data, will now be listed and briefly commented in the case of LTE. See e.g. 3GPP TS 36.214, "Evolved Universal Terrestrial Radio Access (E-UTRA); Physical layer; Measurements" for further details about many of the listed measurements. Also note that the listed measurements are provided merely as examples of measurements performed by the user equipment in accordance with embodiments herein:

Reference Symbol Received Power (RSRP)

Determined for a considered cell as the linear average over the power contributions (in Watt) of the resource elements that carry cell-specific reference signals within the considered measurement frequency bandwidth.

Reference Signal Received Quality (RSRQ)

Defined as the ratio N×RSRP/(E-UTRA carrier RSSI), where N is the number of resource blocks (RB's) of the E-UTRA carrier RSSI measurement bandwidth. The measurements in the numerator and denominator shall be made over the same set of resource blocks.

E-UTRA carrier RSSI (Received Signal Strength Indicator)

Comprises of the total received wideband power observed by the UE from all sources, including co-channel serving and non-serving cells, adjacent channel interference, thermal noise etc.

Rank Indication (RI)

Provides information about the channel rank (number of layers or streams that can be used for downlink transmission.

Channel-Quality Indication (CQI)

Represents the recommended modulation scheme and coding rate that should be used for downlink transmissions.

Pre-Coding Matrix Indication (PMI)

Informs the eNB about which precoding matrix that is the most suitable for downlink communication.

Power Headroom (PH)

The uplink power situation relative the maximum transmitter power level.

Buffer Status Reporting (BSR)

Used to provide the serving eNB with information about the amount of data available for transmission in the uplink buffers of the UE.

Also Observed Time Difference of Arrival (OTDOA) measurements, as discussed in further detail below, may be added to the list.

At least the RSRP and RSRQ measurements may in LTE be reported via RRC, as mentioned previously, and therefore may be of particular interest to use. In LTE such measurements may be included in what is referred to as a "UE measurement report". The other above listed measurements may instead be reported in what in LTE is referred to as "UE feedback reports", typically via Medium Access Control (MAC). Such reports are mainly intended for scheduling and other shorter time scale radio resource mechanisms, while said "UE measurement reports" are mainly intended for mobility and other longer time scale radio resource mechanisms. In the context of embodiments herein and the measurement report referred to in the foregoing, it may correspond to any one of said LTE "UE measurement report" and "UE feedback report", but is not limited to either one of them.

Figure 5A:
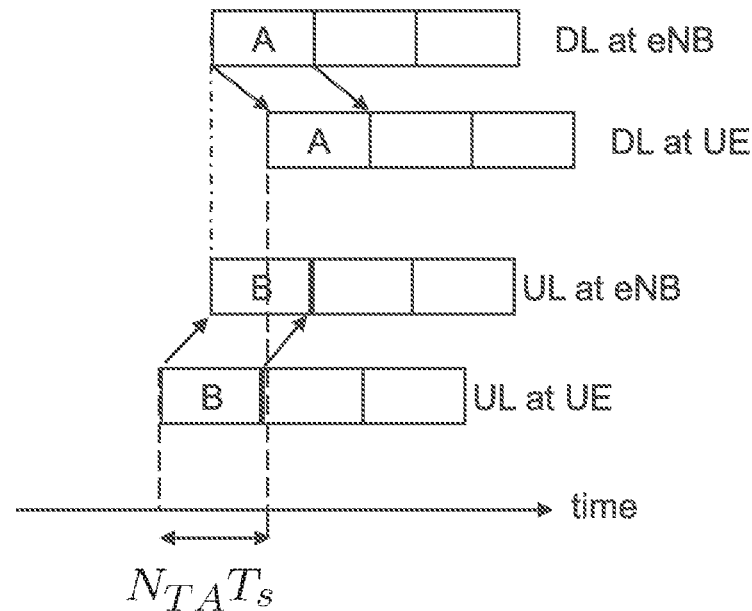
FIG. 5a is a schematic diagram illustrating a timing advance mechanism in LTE.
Figure 5B:
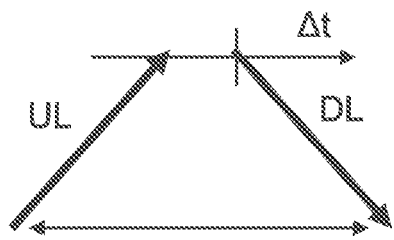
FIGS. 5b-c are schematic illustrations of two situations corresponding to a respective measure resulting from timing misalignment measurements.
Figure 5C:
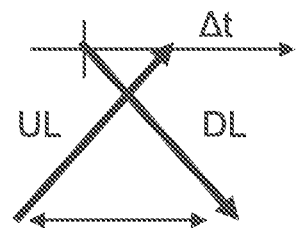
Figure 6:
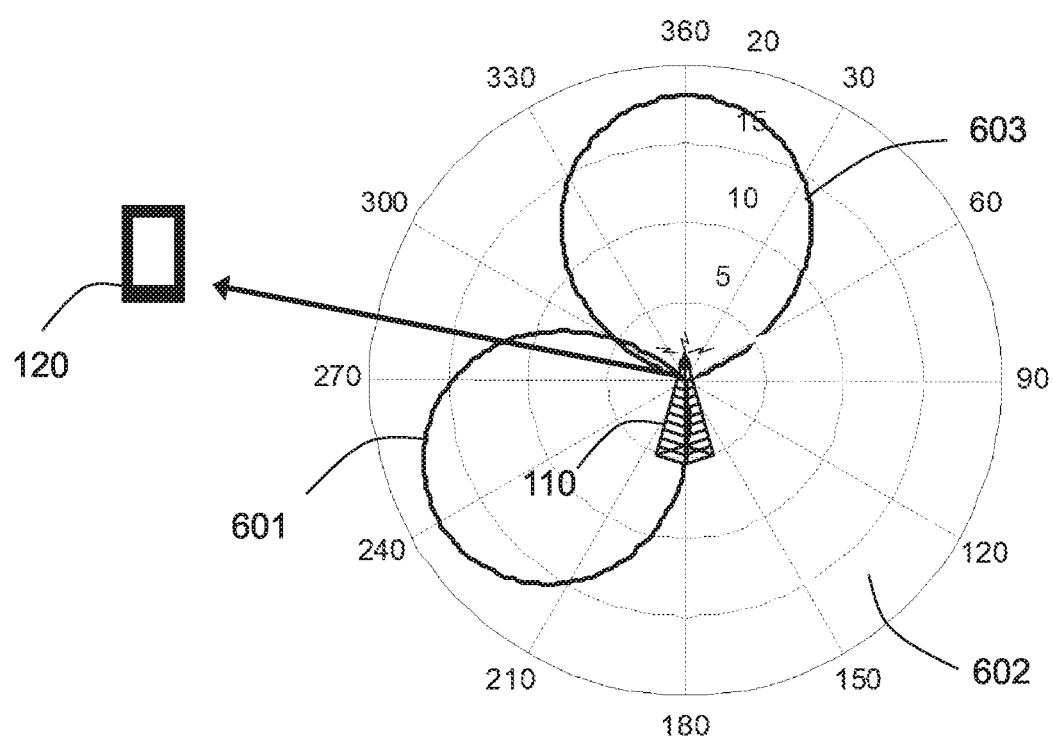
FIG. 6 is a schematic diagram illustrating a situation for a specific direction to the user equipment when it receives signals from a base station.
Figure 7:
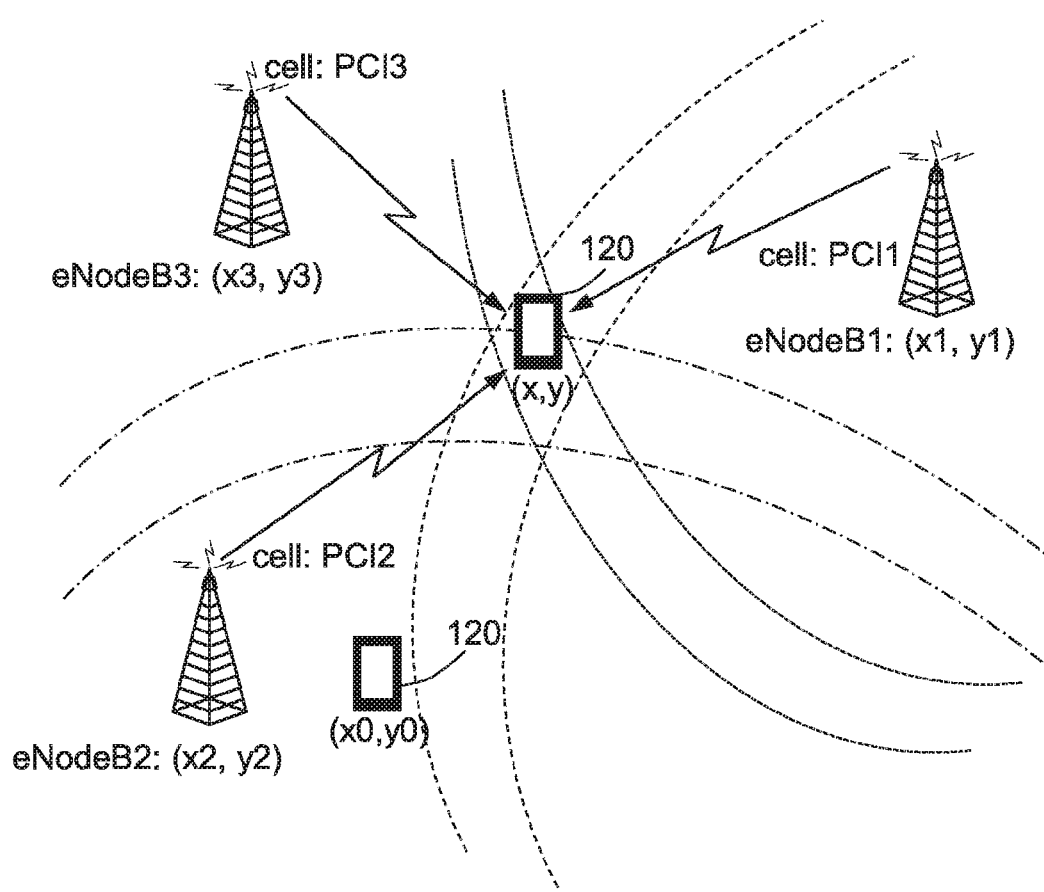
FIG. 7 is a schematic block diagram illustrating an example situation for Time Difference of Arrival.

It will now with reference to FIGS. 5-7 be given some detailed examples and explanations regarding the localization corresponding data referred to in the foregoing and used in the context of embodiments herein. The examples are mainly given in relation to LTE and relates to some specific methods, however, the general underlying principles and similar methods and measurements, as should be understood by the skilled person, are applicable to and available in also to other cellular communication networks.

Round Trip Time (RTT) measurement data, as already mentioned above, is a first example of localization corresponding data. In general RTT is the length of time takes for a signal to be sent plus the length of time it takes for an acknowledgment of that signal to be received. Hence, RTT corresponds to the time it takes to send a signal to the user equipment 120 from the base station 110 and receive a response back, or the other way around. It is realized that by taking into account any significant internal delay involved in the user equipment 120 and the base station 110, and in view of that a radio signal travels at known speed, it is possible to estimate the distance between the user equipment and the base station through the RTT, which corresponds to a localization of the user equipment relative to the base station 110. That is, RTT measurement data is understood to be an example of localization corresponding data.

Two examples of alternative ways of estimating RTT will be discussed below. However, these will be better understood in view of and by first explaining the timing advance mechanism in LTE.

FIG. 5a is a schematic diagram illustrating the timing advance mechanism in LTE. The upper part of the diagram illustrates delay of a frame A in the downlink (DL), i.e. sent from the eNB, corresponding to base station in LTE, to the user equipment (UE). The lower part of the diagram illustrates delay of a frame B in the uplink (UL) sent from the UE to the eNB. In LTE it is stipulated that the transmission of the uplink radio frame number from the UE shall start $N_{TA}T_S$ seconds before the start of the corresponding downlink radio frame at the UE, where $T_S$ is the LTE basic time unit, Ts=1/(2048*15000) seconds. Adequate uplink timing is maintained by sending a timing advance command to the mobile, based on estimated uplink timing of the mobile as illustrated in FIGS. 5b-c.

FIGS. 5b-c are schematic illustrations of two situations corresponding to a respective Δt measure resulting from timing misalignment measurements in the eNB.

Based on Δt the eNB sends quantized corrections to the UE according to $$Q(\Delta t(k)) = \text{round}\left(\frac{\Delta t(k)}{16T_s}\right)$$

Timing update is then performed in the UE according to:

$N_{TA}(k+1) = N_{TA}(k) + 16Q(\Delta t(k))$

From the above it is understood that $N_{TA}T_S$ reflects the RTT. Since timing update as above or similar is continuously ongoing, in basically any cellular communications network of today and not only for LTE, RTT or similar is typically regularly and frequently provided and available in the base station. This makes RTT data of particular interest to use as the first type of data that is localization corresponding discussed above in the context of embodiments herein.

The first one of said examples of alternative ways of estimating RTT is based on use the timing advanced command. The quantized timing misalignment measurements are integrated also on the base station side to form an estimate of RTT:

$N_{TA}(k+1) = N_{TA}(k) + 16Q(\Delta t(k))$ $R\hat{T}T(k+1) = N_{TA}(k+1)T_s$

The accuracy in mainly limited by the quantization, meaning that a representative RTT distribution is uniform with a width of $16T_s$:

$p(R\hat{T}T(k+1)) = U(R\hat{T}T(k+1)-8T_s, R\hat{T}T(k+1)+8T_s)$

The second one of said examples of alternative ways of estimating RTT is based on use of the timing misalignment measurement. The quantization is for limiting the signaling to the mobile. However, a more accurate misalignment measurement could also be considered to form an estimate of RTT:

$$N_{TA}(k+1) = N_{TA}(k) + 16Q(\Delta t(k))$$

$$\hat{N}_{TA}(k+1) = N_{TA}(k) + \frac{1}{T_s}(\Delta t(k))$$

$$\hat{RTT}(k+1) = \hat{N}_{TA}(k+1)T_s$$

Then the accuracy is limited by the timing misalignment accuracy. One typical assumption is that the estimation error is zero-mean Gaussian with variance. Thus, the RTT estimate distribution may be given by:

$$p(RTT) = \frac{1}{\sigma_{misal}\sqrt{2\pi}} e^{-(RTT-\hat{RTT}(k+1))^2/2/\sigma_{misal}}$$

Moreover, the RTT can also be expressed as:

$$\hat{RTT}_i = 2|p_m - p_i|/c + w_i$$

Direction of Departure (DoD) data, as already mentioned above, is a second example of localization corresponding data. Base stations, such as the base station 110, may be capable of estimating the direction of departure or angle of arrival in the uplink, for example by using multiple antennas and correlating the received signals per antenna.

This gives direction estimates together with accuracy distributions that may be provided and available as DoD data. Direction of departure is thus understood to correspond to an area, or sector, where the user equipment 120 is located relative to the base station 110. Hence, direction of departure data is understood to be an example of localization corresponding data.

Direction of departure estimations are typically based on downlink signals and concerns estimation of the angle to the user equipment 120 from the base station 110 perspective with respect to a certain reference. Typical references include a compass with 0 degrees north and increasing directions clockwise up to 360 degrees with is once again north. Another example is complex numbers with 0 degrees along the positive real axis, and increasing counter-clockwise up to 180 degrees at the negative positive axis, and decreasing clockwise to −180 degrees at the negative positive axis.

Note that angle of arrival at the equipment 120 is the direction of departure at the base station 110 plus an 180 degrees offset.

A somewhat more detailed example of DoD data based on Received Signal Strength (RSS) measurement data will now be discussed. The received signal strength $p_R$, which may be the above-mentioned RSRP in LTE, may be expressed as:

$$p_R = p_T + g_L + g_A + g_P + \omega,$$

where $p_T$ is transmitted pilot power, $g_L$ is gain (<0) due to losses due to feeder cables etc, $g_A$ is antenna gain (typically >0), $g_p$ is propagation gain (<0) and w is measurement noise.

FIG. 6 is a schematic diagram illustrating a situation for a specific direction to the user equipment 120 when it receives signals from sectors served by the same base station, in the shown example the base station 110. Further, in the shown example the user equipment 120 receives signals from sectors 601 and 603. For sector 601 the received signal strength is:

$$RSRP_3 = p_3 + g_{T3} + g_{A3} + g_{P3}$$

For sector 603 the received signal strength is:

$$RSRP_1 = p_1 + g_{T1} + g_{A1} + g_{P1}$$

A reasonable assumption is that the propagation gain from two sectors served by the same base station is the same. Furthermore, the pilot powers are either equal considering two different sectors at the served by the same base station, or the difference is known. Similarly, the losses of the feeder cable between the base station and each antenna branch, each serving a sector, are either equal considering two different sectors served by the same base station or the difference is known. Without loss of generality, it is assumed that the pilot power and the feeder losses are the same. This means that the difference between the received signal strengths from two different sectors served by the same base station as:

$$p_{R1} - p_{R3} = p_T + g_L + g_{A1} + g_P + \omega_1 - p_T - g_L - g_{A3} - g_P - \omega_2 = g_{A1} - g_{A3} + \omega_1 - \omega_3$$

Hence, the received signal strength difference is equal to the antenna gain difference plus noise. If the noise per measured sector is considered independent and of variance $\sigma^2_{RSS}$, then the difference is subject to noise with variance $2\sigma^2_{RSS}$. This means that with known antenna information, it is possible to match a reported received signal strength difference to direction of departures corresponding to the reported difference.

Hence received signal strength measurement data may correspond to DoD data.

It may be noted that received signal strength, including RSRP, were also used above as examples of measurements that may be performed by the user equipment 120 and reported to the base station 110. That is, in view of embodiments herein, received signal strength measurement may be comprised in the measurement data and reported in the measurement report and may be of particular interest to use as the second type of data. It represents a measurement that typically is of interest to determine the position of and may at the same time, since it is localization corresponding, be utilized for the position determination according to embodiments herein.

The combination of the second type of data comprising RSS data and the first type of data comprising RTT data may be of particular interest. After the RTT data that corresponds to the time of measurement for the RSS data has been determined, the RTT and RSS data may be used in combination for determining a position of the user equipment at the time of RSS measurement that is more accurate than possible from only RTT or RSS taken alone. The determined position may then be associated with the RSS measurement data and/or report, e.g. as mentioned above, by adding the determined position to the UE measurement report.

The combination of RSS data and RTT data according to embodiments herein may be advantageously used to enhance the conventional handover triggering event due to bad coverage/signal strength with position information. By this a coverage area can easily and in an automated manner be produced for each cell in the cellular communications network 100 and areas with bad coverage may be detected.

Another example of DoD data is such resulting from a more basic DoD method, namely to use information about the beam direction of the base station 110. It may be assumed that the user equipment 120 is always within an angular range half way to neighboring cells served by the same base station and that the estimation error distribution is uniform within that range.

Yet another example of DoD data is such resulting from DoD estimations for a base station, such as the base station 110, equipped with multiple antennas. It is then possible to consider coherent combination of the per-antenna received signals. Popular approached include subspace methods for frequency estimation, where the signal space and the noise space are separated—each spanned by eigen-vectors associated to corresponding singular values. Popular approaches include Multiple Signal Classification (MUSIC) based on a direct singular value decomposition and Estimation Of Signal Parameters Via Rotational Invariance Techniques (ESPRIT).

Time Difference of Arrival (TDOA) data, as already mentioned above, is a third example of localization corresponding data. Time difference of arrival is available in various cellular communication networks 100, however, the LTE Observed Time Difference of Arrival (OTDOA) will be briefly described here for reference.

FIG. 7 is a schematic block diagram illustrating an example situation for OTDOA with the user equipment receiving signals from three base stations eNodeB1, eNodeB2 and eNodeB3.

When OTDOA alone is used for position determination, it typically requires receipt of signals from three base stations for desired accuracy in the position determination, as already mentioned. However, embodiments herein enable OTDOA to be used in position determination with receipt signals from only two base stations if combined with another kind of localization corresponding data. For example may the OTDOA data based on signals from two base stations be comprised in the second type of data and RTT data be comprised in the first type of data.

An example of OTDOA measurement based in signals received from two base stations will now be discussed. The user equipment 120 measures the OTDOA between two incident signals from base stations i and j. It is assumed that the relative time offset $\Delta_{ij}$ between base stations i and j is known. The OTDOA measurement may be expressed as:

$$\hat{\tau}_{ji} = \tau_{ji} - \Delta_{ji} = |p_m - p_j|/c - |p_m - p_i|/c + w_{ji},$$

where $p_m = (x,y)$ denotes the position of the user equipment 120, $p_i = (xi, yi)$ is the position of base station i, $pj = (xj, yj)$ is the position of base station j, and c denotes the speed of light. Base stations i and j may correspond to a respective one of the base stations eNodeB1, eNodeB2 and eNodeB3 in FIG. 7, i.e. two the base stations shown in FIG. 7. In FIG. 7, the base stations eNodeB1, eNodeB2 and eNodeB3 have positions $p1=(x1,y1)$, $p2=(x2,y2)$ and $p3=(x3,y3)$ respectively.

Timing estimation accuracies can be considered Gaussian with variance $\sigma_{timing}^2$, which means that the OTDOA measurement error is also Gaussian but with variance $2\sigma_{timing}^2$. Thus, the OTDOA estimate distribution is given by:

$$p(\hat{\tau}_{ij}(k+1)) = \frac{1}{\sigma_{timing} 2\sqrt{\pi}} e^{-(\tau - \hat{\tau}_{ij}(k+1))^2/2\sqrt{2}/\sigma_{timing}}$$

Examples in case of LTE of how first type of data comprising RTT measurement data together with second type of data comprising OTDOA measurement data will now be discussed. It is assumed in the following that RTT measurement data corresponding to the time of measurement of the OTDOA measurement data in the measurement report has been determined in accordance with embodiments herein and then been associated with the OTDOA measurement data. That is, it is assumed that the localization corresponding information from the RTT and OTDOA measurement data have been time aligned. Two examples are provided below, a low complexity one and directly following thereafter, a more detailed one. Similar denominations as in the foregoing are used, e.g. i and j for the base stations that are involved in the OTDOA measurement.

Low Complexity Example

By neglecting the noise contributions, the available and time aligned localization information can be used to disclose two relative distance equations:

$$\hat{d}_{mi} = \frac{1}{2}\hat{RTT}_i = |p_m - p_i|/c \Leftrightarrow \tilde{y}_1 = \tilde{h}_1(p_m, p_i, p_j) + \tilde{e}_1$$

$$\hat{d}_{mj} = \hat{\tau}_{ji} + \frac{1}{2}\hat{RTT}_i = |p_m - p_j|/c \Leftrightarrow \tilde{y}_2 = \tilde{h}_2(p_m, p_i, p_j) + \tilde{e}_2$$

where $\hat{RTT}_i$ denotes the estimated RTT with respect to the serving base station, $\hat{d}_{mi}$ the associated estimated relative distance between the mobile and the serving cell i, and $\hat{d}_{mj}$ estimated distance between the mobile and the non-serving cell j.

The problem is then reduced to determine the position given two relative distance equations, which as realized by the skilled person may be solved using geometrical calculations, or by finding the position estimate that minimizes a criterion, for example a quadratic position error criterion which gives a least squares position estimate. In these estimations, one may assume that the measurement and estimation errors of and $\hat{d}_{mi}$ and $\hat{d}_{mj}$ ($\tilde{e}_1$ and $\tilde{e}_2$) are zero.

More Detailed Example

Both the OTDOA measurement and the TA procedure rely on time synchronization at the user equipment side and in the latter case also at the base station side. For OTDOA, the user equipment 120 determines the time of arrival with respect to the two base stations i and j with an estimation error, $w_i^m$ and $w_j^m$ respectively, where the m indicates the user equipment 120. mobile. For TA, the base station also estimates the time of arrival of the uplink signals, with an estimation error $w_i^b$. Hence, an accurate localization measurement modeling may be given by equations:

$$\hat{RTT}_i = 2|p_m - p_i|/c + w_i^m + w_i^b$$

$$\tau_{ji} = |p_m - p_j|/c - |p_m - p_i|/c + w_j^m + w_i^m$$

For example, considering the serving base station to correspond to i and the non-serving base station to correspond to j, the equations can be rewritten as:

$$\hat{RTT}_i = 2|p_m - p_i|/c + w_i^m + w_i^b \Leftrightarrow y_1 = h_1(p_m, p_i, p_j) + e_1$$

$$\tau_{ji} = |p_m - p_j|/c - |p_m - p_i|/c + w_j^m + w_i^m \Leftrightarrow y_2 = h_2(p_m, p_i, p_j) + e_2$$

By introducing $\text{Cov}\{w^m\} = \sigma_m^2$ and $\text{Cov}\{w^b\} = \sigma_b^2$ we get:

$$R = Cov\left\{\begin{pmatrix} e_1 \\ e_2 \end{pmatrix}\right\} = \begin{pmatrix} \sigma_m^2 + \sigma_b^2 & \sigma_m^2 \\ \sigma_m^2 & 2\sigma_m^2 \end{pmatrix}$$

One approach to resolve the position in the least squares sense is to consider a gradient search. In this case, the gradient can be obtained as:

$$\nabla_{p_m} h(p_m) = \begin{pmatrix} \frac{\partial h_1}{\partial p_m} & \frac{\partial h_2}{\partial p_m} \end{pmatrix}^T, \text{ where}$$

$$\frac{\partial h_1}{\partial p_m} = 2 \frac{p_m - p_i}{|p_m - p_i|}, \text{ and}$$

$$\frac{\partial h_2}{\partial p_m} = \frac{p_m - p_j}{|p_m - p_j|} - \frac{p_m - p_i}{|p_m - p_i|}$$

One example of gradient search is a stochastic gradient search, which is an iterative search that may for each step k be described by:

$$p_m^{(k+1)} = p_m^{(k)} + \mu^{(k)} \nabla_{p_m} h(p_m^{(k)})^T (y - h(p_m^{(k)}))$$

If information about the error covariance R=Cov{e} is available, then this information can be considered by proper weighting according to:

$$p_m^{(k+1)} = p_m^{(k)} + \mu^{(k)} \nabla_{p_m} h(p_m^{(k)})^T R^{-1} (y - h(p_m^{(k)}))$$

One example of scale factor is a constant $\mu^{(k)} = \mu_0$. Another is to scale the effective step size by the gradient magnitude such as:

$$\mu^{(k)} = \frac{\mu_0}{\nabla_{p_m} h(p_m^{(k)})^T \nabla_{p_m} h(p_m^{(k)})}$$

Note also that the same strategy can be considered for the low complexity example above. Then, the gradient becomes:

$$\nabla_{p_m} \tilde{h}(p_m) = \begin{pmatrix} \frac{\partial \tilde{h}_1}{\partial p_m} & \frac{\partial \tilde{h}_2}{\partial p_m} \end{pmatrix}^T, \text{ where}$$

$$\frac{\partial \tilde{h}_1}{\partial p_m} = \frac{p_m - p_i}{|p_m - p_i|}, \text{ and}$$

$$\frac{\partial \tilde{h}_2}{\partial p_m} = \frac{p_m - p_j}{|p_m - p_j|}$$

In some embodiments, the search may be made under the assumption that the measurement errors are independent. Alternatively, the more detailed correlation information can be considered:

$$\tilde{y}_1 = \tilde{h}_1(p_m, p_i, p_j) + \frac{1}{2} w_i^m + \frac{1}{2} w_i^b$$

$$\tilde{y}_2 = \tilde{h}_2(p_m, p_i, p_j) + w_i^m + w_j^m + \frac{1}{2} w_i^b + \frac{1}{2} w_i^b$$

A corresponding covariance matrix is thus:

$$\tilde{R} = Cov\left\{\begin{pmatrix} \tilde{e}_1 \\ \tilde{e}_2 \end{pmatrix}\right\} = \begin{pmatrix} \frac{1}{4}\sigma_m^2 + \frac{1}{4}\sigma_b^2 & \frac{3}{4}\sigma_m^2 + \frac{1}{4}\sigma_b^2 \\ \frac{3}{4}\sigma_m^2 + \frac{1}{4}\sigma_b^2 & \frac{13}{4}\sigma_m^2 + \frac{1}{4}\sigma_b^2 \end{pmatrix}$$

Furthermore, it can be relevant to estimate the accuracy of the estimate. One approach is to calculate the quadratic cost function:

$$V(p_m) = (y - h(p_m, p_i, p_j))^2$$

over a grid $p_m^{(n)}$, n=1:N surrounding the estimate $\hat{p}_m$, and then fit a quadratic function to the grid:

$$V(p_m^{(n)}) = (p_m^{(n)} - \hat{p}_m)^T P(p_m^{(n)} - \hat{p}_m)$$

and thereby determine the covariance P of the position estimate.

Figure 8:
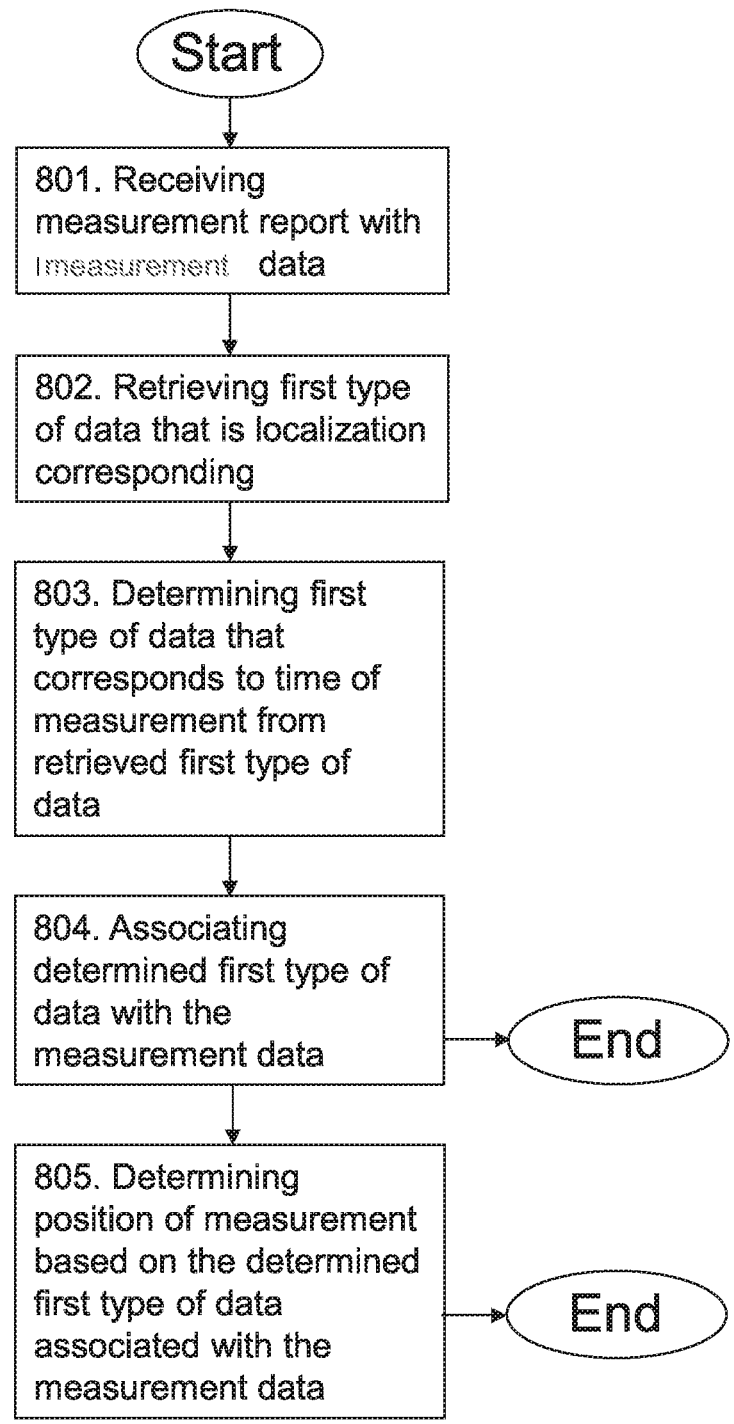
FIG. 8 is a flow chart illustrating a method according to embodiments herein.

The network node determining the position according to embodiments herein may gather statistics of how often it is able to determine a position, possibly also the accuracy, and how often that the determined position is within an acceptable accuracy. Embodiments herein relating to a method for enabling position determination of a measurement performed by the user equipment 120 served by the base station 110, will now be further elaborated and described with reference to the flowchart depicted in FIG. 8. The user equipment 120 and the base station 110 are comprised in the cellular communications network 100. The actions numbered in the figure and referred to below may e.g. be carried out in the network node 910 referred to below, the base station 110, the management entity 140, or a combination thereof. The method comprises the following actions, which actions may be taken in any suitable order:

Action 801

A measurement report comprising measurement data associated with the measurement and a time of measurement thereof is received from the user equipment 120. In some embodiments the measurement report is received in response to an event triggered by the user equipment 120 receiving a weak and/or low quality signal from the base station 110.

In some embodiments the measurement report comprises second type of data associated with the user equipment 120 at the time of measurement, which second type of data is localization corresponding data. The second type of data may comprise direction of departure related data and/or time difference of arrival measurement data. The direction of departure related data may comprise received signal strength measurement data.

This action may correspond fully or partially to the previously described action 301.

Action 802

One or more first type of data associated with the user equipment (120) at a respective point in time is retrieved, which first type of data is localization corresponding data. The first type of data associated with the user equipment may be provided independent on the measurement performed by the user equipment 120.

In some embodiments the first type of data comprises time measurement data corresponding to a distance to the user equipment 120 from the base station 110. The time measurement data may comprise round trip time measurement data.

This action may correspond fully or partially to the previously described action 302.

Action 803

Based on the time of measurement, first type of data that corresponds to the time of measurement is determined from the retrieved one or more first type of data.

In some embodiments, the determining of the first type of data corresponding to the time of measurement comprises selecting retrieved first type of data that is associated with the user equipment 120 at a point in time that is adjacent the time of measurement.

Also, in some embodiments the determining of the first type of data corresponding to the time of measurement comprises interpolating retrieved first type of data that are associated with the user equipment 120 at points in time that are before and after the time of measurement.

This action may correspond fully or partially to the previously described action 303.

Action 804

The determined first type of data is associated with the measurement data.

This action may correspond fully or partially to the previously described action 304.

Action 805

This is an optional action for embodiments herein. The position of the measurement is determined based on the determined first type of data associated with the measurement data.

Figure 9:
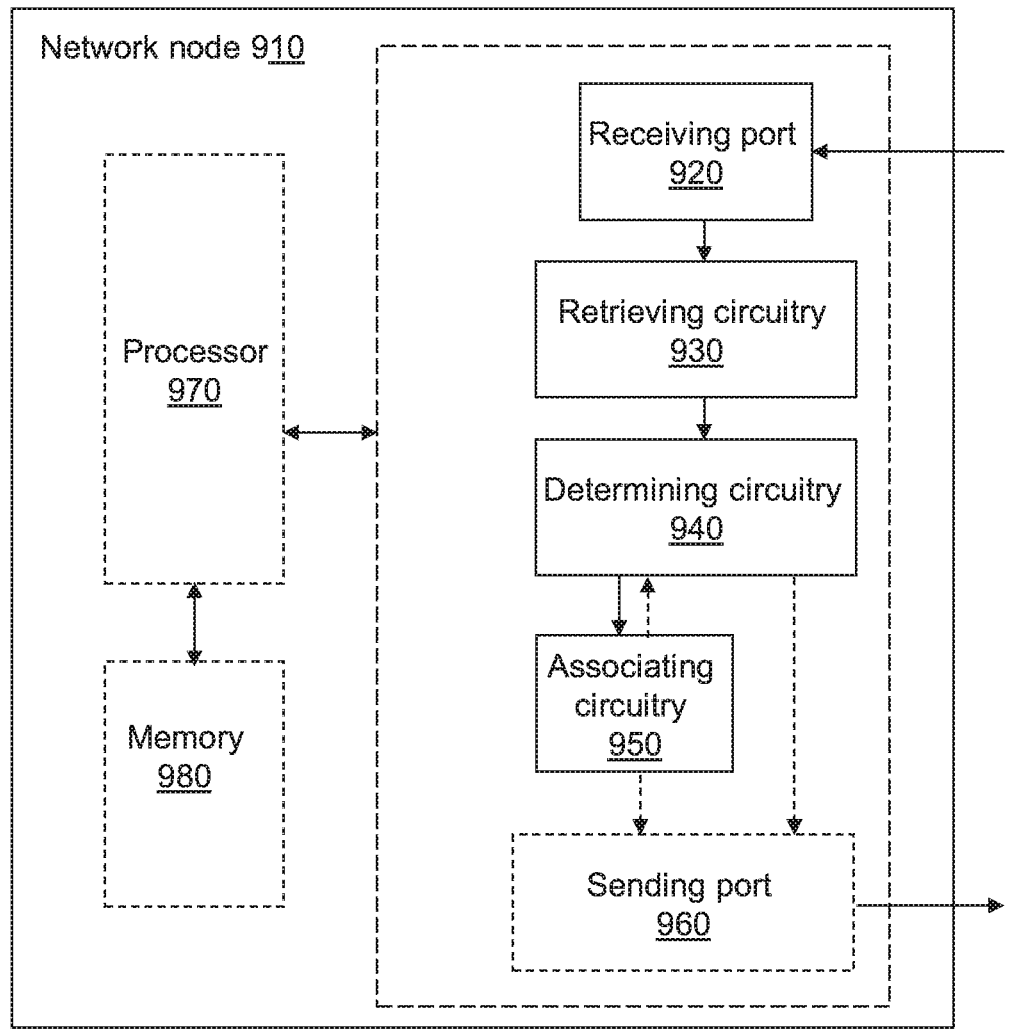
FIG. 9 is a schematic block diagram showing a network node according to embodiments herein.

To perform the actions above for enabling position determination of a measurement performed by the user equipment 120 served by the base station 110, the base station 110, or in general a network node 910, may comprise an arrangement schematically depicted in FIG. 9. The network node 910 may be a network node as discussed in the foregoing and may for example be the base station 110 configured to serve the user equipment 120. The network node 910, the user equipment 120 and the base station 110 are comprised in the cellular communications network 100.

The network node 910 comprises a receiving port 920, configured to receive, from the user equipment 120, a measurement report comprising measurement data associated with the measurement and a time of measurement thereof. The receiving port 920 may be configured to receive the measurement report in response to an event triggered by the user equipment 120 receiving a weak and/or low quality signal from the base station 110.

The network node 910 further comprises a retrieving circuitry 930, configured to retrieve one or more first type of data associated with the user equipment 120 at a respective point in time, which first type of data is localization corresponding data. The first type of data associated with the user equipment 120 may be provided independent on the measurement performed by the user equipment 120. In some embodiments the first type of data comprises time measurement data corresponding to a distance to the user equipment 120 from the base station 110. The time measurement data may comprise round trip time measurement data.

Moreover, the network node comprises a determining circuitry 940, configured to, based on the time of measurement, determine a first type of data from the retrieved one or more first type of data, which determined first type of data corresponds to the time of measurement. In some embodiments the determining circuitry 940 is further configured to select retrieved first type of data that is associated with the user equipment 120 at a point in time that is adjacent the time of measurement. The determining circuitry 940 may be further configured to interpolate retrieved first type of data that are associated with the user equipment 120 at points in time that are before and after the time of measurement.

Furthermore, the network node comprises an associating circuitry 950, configured to associate the determined first type of data with the measurement data, thereby enabling the position determination.

In some embodiments, the measurement report comprises second type of data associated with the user equipment 120 at the time of measurement, which second type of data is localization corresponding data. The second type of data may comprise direction of departure related data and/or time difference of arrival measurement data.

The direction of departure related data may comprise received signal strength measurement data.

In some embodiments the determining circuitry 940 is further configured to determine the position of the measurement based on the determined first type of data associated with the measurement data.

The network node 910 may typically also comprise a sending port 960, that may be configured to send the determined first type of data associated with the measurement data to another network node (not shown) in the cellular communications network 100. For example, if the network node 910 is the base station 110, said another network node may be the management entity 140. When the determining circuitry 940 is configured to determine the position of the measurement, the sending port may be configured to instead send the determined position to said another network node.

The embodiments of the network node 910 may be implemented through one or more processors, such as a processor 970 in the base station network node 910 depicted in FIG. 9, together with computer program code for performing the functions and actions of embodiments herein. In some embodiments the ports and circuitry discussed above may be fully or partially implemented by the processor 970.

The program code mentioned above may also be provided as a computer program product, for instance in the form of a data carrier carrying computer program code for performing the embodiments herein when being loaded into the in the network node 910. One such carrier may be in the form of a CD ROM disc. It is however feasible with other data carriers such as a memory stick or memory card. The computer program code may furthermore be provided as pure program code on a server and downloaded to the network node 910.

The network node 910 may further comprise a memory 980 comprising one or more memory units. The memory 980 is arranged to be used to store data, such as calculated final and intermediate results, such as the above mentioned retrieved first type of data, received measurement data and configurations and applications to perform the method when being executed in the network node 910.

Those skilled in the art will also appreciate that the receiving port 920, the retrieving circuitry 930, the determining circuitry 940, the associating circuitry 950 and the sending port 960 may refer to a combination of analog and digital circuits, and/or one or more processors configured with software and/or firmware (e.g., stored in memory) that, when executed by the one or more processors such as the processor 970, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Many embodiments and examples that have been discussed herein relate to LTE. However, this is only for exemplifying purpose and is not to be construed as limiting embodiments herein to LTE only.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for enabling position determination of a measurement performed by a user equipment served by a base station, the user equipment and the base station being comprised in a cellular communications network, wherein the method comprises:
   receiving, from the user equipment, a measurement report comprising measurement data associated with the measurement and a time of measurement thereof, wherein a time of transmission of the measurement report from the user equipment or a time of receipt of the transmission report by the network node is used as the time of measurement,
   retrieving one or more first type of data associated with the user equipment at a respective point in time, wherein the one or more first type of data is localization corresponding data, wherein the one or more first type of data is provided by the base station and is independent of the measurement performed by the user equipment,
   determining, based on the time of measurement, a first type of data from the retrieved one or more first type of data at a point in time adjacent the time of measurement, wherein the determined first type of data corresponds to the time of measurement, and
   associating the determined first type of data with the measurement data, thereby enabling the position determination.

2. The method as claimed in claim 1, wherein the measurement report comprises a second type of data associated with the user equipment at the time of measurement, wherein the second type of data is the localization corresponding data.

3. The method as claimed in claim 2, wherein the second type of data comprises direction of departure related data and/or time difference of arrival measurement data.

4. The method as claimed in claim 3, wherein the direction of departure related data comprises received signal strength measurement data.

5. The method as claimed in claim 1, wherein the first type of data comprises time measurement data corresponding to a distance of the user equipment from the base station.

6. The method as claimed in claim 5, wherein the time measurement data comprises round trip time measurement data.

7. The method as claimed in claim 1, wherein the determining of the first type of data corresponding to the time of measurement comprises selecting the retrieved first type of data that is associated with the user equipment at the point in time that is adjacent the time of measurement.

8. The method as claimed in claim 1, wherein the determining of the first type of data corresponding to the time of measurement comprises interpolating the retrieved first type of data that are associated with the user equipment at points in time that are before and after the time of measurement.

9. The method as claimed in claim 1, wherein the method further comprises:
   determining the position of the measurement based on the determined first type of data associated with the measurement data.

10. The method as claimed in claim 1, wherein the measurement report is received in response to an event triggered by the user equipment receiving a weak and/or low quality signal from the base station.

11. A network node for enabling position determination of a measurement performed by a user equipment served by a base station, the network node, the base station and the user equipment being comprised in a cellular communications network, wherein the network node comprises:
   a receiving port, configured to receive, from the user equipment, a measurement report comprising a measurement data associated with the measurement and a time of measurement thereof, wherein a time of transmission of the measurement report from the user equipment or a time of receipt of the transmission report by the network node is used as the time of measurement, and
   processing circuitry configured to:
   retrieve one or more first type of data associated with the user equipment at a respective point in time, wherein the one or more first type of data is a localization corresponding data, wherein the one or more first type of data is provided by the base station and is independent of the measurement performed by the user equipment,
   determine, based on the time of measurement, a first type of data from the retrieved one or more first type of data at a point in time adjacent the time of measurement, wherein the determined first type of data corresponds to the time of measurement; and
   associate the determined first type of data with the measurement data.

12. The network node as claimed in claim 11, wherein the measurement report comprises a second type of data associated with the user equipment at the time of measurement, wherein the second type of data is the localization corresponding data.

13. The network node as claimed in claim 12, wherein the second type of data comprises direction of departure related data and/or time difference of arrival measurement data.

14. The network node as claimed in claim 13, wherein the direction of departure related data comprises received signal strength measurement data.

15. The network node as claimed in claim 11, wherein the first type of data comprises time measurement data corresponding to a distance of the user equipment from the base station.

16. The network node as claimed in claim 11, wherein the time measurement data comprises round trip time measurement data.

17. The network node as claimed in claim 11, wherein the processing circuitry is further configured to select the retrieved first type of data that is associated with the user equipment at the point in time that is adjacent the time of measurement.

18. The network node as claimed in claim 11, wherein the processing circuitry is further configured to interpolate the retrieved first type of data that are associated with the user equipment at points in time that are before and after the time of measurement.

19. The network node as claimed in claim 11, wherein the processing circuitry is further configured to determine the position of the measurement based on the determined first type of data associated with the measurement data.

20. The network node as claimed in claim 11, wherein the receiving port is further configured to receive the measurement report in response to an event triggered by the user equipment receiving a weak and/or low quality signal from the base station.

* * * * *